(12) United States Patent
Chamberlain

(10) Patent No.: US 7,905,132 B1
(45) Date of Patent: Mar. 15, 2011

(54) LEAK TESTING USING TRACER GAS PERMEABLE MEMBRANE

(75) Inventor: Paul A. Chamberlain, Holladay, UT (US)

(73) Assignee: LACO Technologies, Inc., Salt Lake City, UT (US)

( * ) Notice: Subject to any disclaimer, the term of this patent is extended or adjusted under 35 U.S.C. 154(b) by 711 days.

(21) Appl. No.: 11/838,797

(22) Filed: Aug. 14, 2007

(51) Int. Cl.
*G01M 3/20* (2006.01)

(52) U.S. Cl. .......................... 73/40.7; 73/49.2

(58) Field of Classification Search ............... 73/40.7, 73/49.2, 49.3
See application file for complete search history.

(56) References Cited

U.S. PATENT DOCUMENTS

| 4,419,882 A | 12/1983 | Ishii et al. |
| 5,728,929 A | 3/1998 | Gevaud |
| 2009/0100909 A1* | 4/2009 | Grosse Bley et al. ........ 73/40.7 |

OTHER PUBLICATIONS

WO 2006/032591 A1 Inficon GMBH. Leak Testing Method and Leak Testing Device Comprising a Partial Pressure Sensor.*
Schroder, Gehard. Neue Norm Zur Auswahl eines geeigneten Verfahrens zur Lexsuch and Dichtheitsprufung. ZfP-Zeitung 74. Apr. 2001. 31-39.*
Falcon Leak Test Systems, 2003 by Cincinnati Test Systems Inc., (2 pages) (Attached as Article 1).
Laco Technologies, Production Leak Testing, Theory and Application, The Why, What, and How of Production Leak Testing, 2005., (16 pages) (Attached as Article 2).

* cited by examiner

*Primary Examiner* — John Fitzgerald
(74) *Attorney, Agent, or Firm* — Workman Nydegger (57) ABSTRACT

Leak testing using a testing chamber into which a test part may be configured for testing. The test part defines a leak test boundary to be tested. Tracer gas is introduced into a first volume on one side of the leak test boundary. A vacuum (e.g., a rough vacuum) may be introduced into a second volume on the opposite side of the leak test boundary. A tracer gas permeable membrane is placed in situ within the second volume, or at least in gaseous communication with the second volume perhaps within or rigidly attached to the wall of the chamber. During testing, if some of the tracer gas introduced into the first volume were to leak through the leak test boundary defined by the test part into the second volume, at least some of that tracer gas may pass the tracer gas permeable membrane for subsequent detection.

28 Claims, 5 Drawing Sheets

LEAK TESTING USING TRACER GAS PERMEABLE MEMBRANE

BACKGROUND

Leak testing is used to verify the integrity of a subject item under test. There are a variety of items that have been subjected to leak testing of one type or another. These items may be referred to generically as a "test part".

Leak testing technology is used to verify whether or not the test part has a leak, and sometimes the amount of leaking involved. In some cases, leak testing may also be used to estimate generally where the leak is coming from. Production leak testing aims to identify leaking parts before they are shipped to a customer. Leak testing may also be practiced in the field, after the test part has already shipped and even possibly after the test part has been installed into a larger system (if the test part is a part of a larger system, rather than a stand alone piece).

There are a variety of leak tests conventionally available. Some of these test methods use air, and some use tracer gas. Some air-based testing methods include pressure decay testing, mass flow leak testing, bubble-immersion testing, and so forth. Tracer gas leak testing methods include a wide variety of methods. Two of these methods called helium atmospheric accumulation testing and helium hard vacuum testing will now be briefly summarized.

Helium atmospheric accumulation testing sometimes measures a leak flowing from a test part that is pressured with gas that includes tracer gas such as helium. If there were one or more leaks in the test part, helium (and perhaps other gases) would leak into the ambient environment. This testing method, however, provides a chamber or enclosure which, at least temporarily, captures all or some of the gases that leak from the test part. The helium levels may then be measured to infer the total leak rate for the test part.

In the helium hard vacuum test, helium gas is sealed inside a test part and a high vacuum is applied to the outside of the test part. Alternatively, helium gas is introduced to the outside of the test part, and the inside of the test part is evacuated to a high vacuum. In either case, a mass spectrometer in the hard vacuum side of the boundary then detects leakage across the boundary by detecting small amounts of helium gas present in the vacuum.

BRIEF SUMMARY

Embodiments described herein relate to leak testing using a testing chamber into which a test part may be test configured such that the leak test boundary of the test part is situated between two volumes. Tracer gas is introduced into a first volume on one side of the leak test boundary. Optionally, a vacuum may be introduced into a second volume on the opposite side of the leak test boundary. A tracer gas permeable membrane is placed in situ within the second volume, or at least in gaseous communication with the second volume perhaps within the wall of the chamber. During testing, if some of the tracer gas introduced into the first volume were to leak through the leak test boundary defined by the test part into the second volume, at least some of that tracer gas may pass the tracer gas permeable membrane, and then be detected.

In one specific embodiment, a vacuum introduced in the second volume is not a hard or high vacuum, but is a rough vacuum. However, a hard vacuum or no vacuum may also be used consistent with the broadest principles of the present invention. Additional embodiments will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the embodiments of the invention can be obtained, a more particular description of features of the invention briefly described above will be rendered by reference to specific embodiments thereof which are illustrated in the appended drawings. Understanding that these drawings depict only typical embodiments of the invention and are not therefore to be considered to be limiting of its scope, features of embodiments of the invention will be described and explained with additional specificity and detail through the use of the accompanying drawings in which.

DETAILED DESCRIPTION

Embodiments of the present invention relate to leak testing using a testing chamber into which a test part may be configured for testing. The test part includes at least a portion that defines a leak test boundary such that when the test part is configured in the testing chamber, the leak test boundary is situated between two volumes. Tracer gas may be introduced into a first volume within the chamber on one side of the leak test boundary defined by the test part. In some embodiments, a vacuum may be introduced into a second volume within the chamber on the opposite side of the leak test boundary. A tracer gas permeable membrane is positioned within the second volume or at least in gaseous communication with the second volume. During testing, if some of the tracer gas introduced into the first volume were to leak through the leak test boundary defined by the test part into the second volume, at least some of that tracer gas may pass the tracer gas permeable membrane for downstream detection.

Since the tracer gas passes through the membrane, the membrane may filter other contaminants such that they do not pass. Thus, equipment downstream of the membrane may be kept in cleaner condition.

By placing the membrane in situ within the chamber, as a part of the chamber itself, rigidly attached to the chamber, or at least in close proximity to the chamber if external to the chamber, the leaked tracer gas need not travel a significant distance before passing through the membrane. Accordingly, the amount of tracer gas passing through the membrane is a more real-time representation of the actual tracer gas amounts present in the second volume.

In one embodiment, a rough vacuum is used in the second volume of the chamber, although a hard vacuum may also be used. For example, a rough vacuum may have an absolute pressure of 10 Torr or greater or perhaps 50 Torr or greater. This compares to one standard atmosphere of 760 Torr. In one embodiment, a rough vacuum may even have an absolute pressure of as high as 300 Torr, or even up to just below the ambient pressure of the environment in which the testing is performed. In this description and in the claims, a "rough vacuum" is defined as a vacuum having a pressure anywhere from 10 Torr to as high as just below the ambient pressure of the environment, or any other pressure range within that larger pressure range. A "medium rough vacuum" is defined as a vacuum having an absolute pressure between 50 Torr and 300 Torr, or any other pressure within that larger pressure range. That said, the principles of the present invention may operate under hard vacuum or no vacuum conditions as well. The vacuum levels used, if any, may differ according to the type of testing, and the nature of the test part.

The use of a rough vacuum permits for faster testing than hard vacuum methods since the time required to draw a rough vacuum can be significantly shorter than the time required to draw a hard vacuum. Furthermore, the rough vacuum testing may be performed for many test parts that are unable to withstand full hard vacuum, but that can withstand a lesser vacuum. In addition, the gas molecules travel faster under vacuum, thus gaseous mixing occurs faster under vacuum than in atmosphere. The tracer gas leaking into the second volume mixes faster (compared to atmospheric pressure), and thus the amount of tracer gas that passes through the membrane soon represents that amount of tracer gas actually present in the second volume that leaked through the test part.

The use of a rough vacuum may also reduce the amount of tracer gas needed, compared to atmospheric accumulation. This is due to greater differential pressure across the leak boundary creating a larger gas flow for a given leak. On a related matter, this also improves the sensitivity of the leak test. After all, the test chamber will have lower tracer gas background noise as compared to the atmospheric accumulation method because the rough vacuum removes some of the residual tracer gas. Accordingly, smaller leaks can be more easily detected as compared to atmospheric accumulation.

Figure 1A:
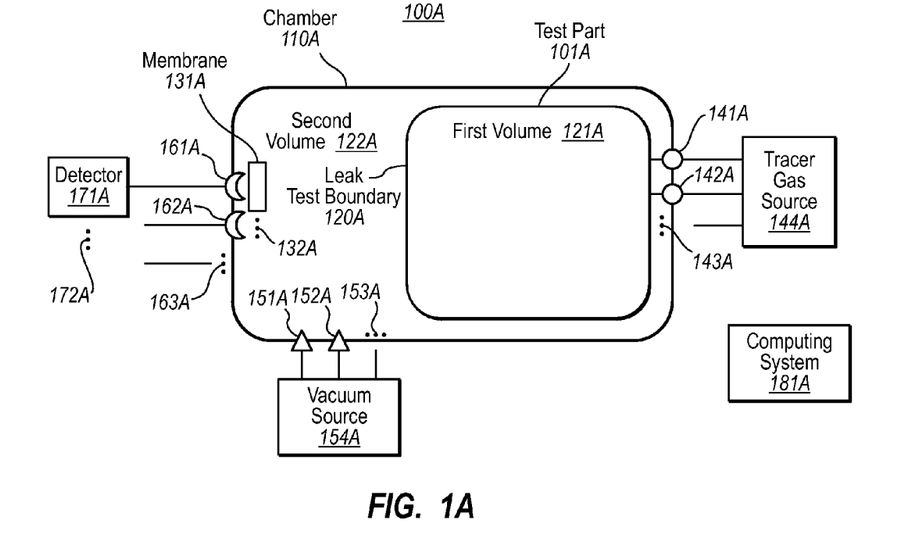
FIG. 1A schematically illustrates one embodiment of a leak test system in accordance with the principles of the present invention in which leaks are detected based on tracer gas flow from the test part into the chamber, and through one or more membranes in the chamber.

FIG. 1A schematically illustrates a leak testing system 100A in accordance with one embodiment of the principles of the present invention in which out-leak testing is performed. In other words, leaks are detected based on tracer gas passing from the inside to the outside of the test part.

The leak testing system includes a chamber 110A and a test part 101A included within the chamber 110A. Although the chamber 110A and the test part 101A are illustrated as having a particular shape, the chamber 110A and the test part 101A are just abstractly represented in FIGS. 1A and 1B. Accordingly, as is the case with FIG. 1B, the principles of the present invention are not limited to any particular shape or volume of the chamber 110A and the test part 101A of FIG. 1A. The broad principles may be applied to any test part of any shape, and to any chamber of any shape. Accordingly, the chamber 110A and the test part 101A should be viewed as only abstract representations.

Nevertheless, regardless of the particular shape and volume of the chamber 110A, and regardless of whether the test part 101A is a closed or open test part, the chamber 110A is structured such that a test part 101A may be "test configured" inside the chamber 110A. In this description and in the claims, the test part is "test configured" within the chamber if the test part is ready for leak testing within the chamber. The precise steps and structures involved with test configuring may depend on the nature of the chamber and test part.

For instance, the test part 101A of FIG. 1A is illustrated as being "closed". If the test part 101A is closed, the test part itself fully seals in a volume capable of holding gas (unless there are undesired leaks in the closed part). If the test part 101A of FIG. 1A is a closed test part, then test configuring the test part 101A may involve simply sealing tracer gas in the test part 101A, and then placing the test part 101A into the chamber 110A. Thus, when test configuring a closed test part inside a chamber 110A, as is the case with FIG. 1A, the inside of the chamber includes a first volume 121A within the test part 101A, and a second volume 122A outside of the test part 101A but still within the chamber 110A. The test part 101A defines a leak test boundary 120A between the first and second volumes 121A and 122A.

However, the application of the principles of the present invention is not limited by any means to the leak testing of closed test parts. Rather, the principles of the present invention also extend to the leak testing of open test parts. Open test parts are not capable of sealing in a volume, at least not without the help of other fixtures that might attach to the open test part. An example of an open test part might be, for example, a cup-shaped test part that is open at the top. Another might be a simple flat plate-shaped test part. There is no limit to the shape or configuration of open test parts that may be used with the principles described herein.

In the case of an open test part, the test configuring of the open test part within the chamber may involve attaching the open test part to one or more other items (e.g., one or more walls of the chamber, and/or to other fixture(s)) such that the open test part defines the leak test boundary, and such that the open test part in combination with the attached item(s) defines a volume on one side of the leak test boundary. The volume is hopefully sealed by the open test part and the attached item(s) provided there are no leaks in the leak test boundary defined by the open test part. Referring to FIG. 1A, the first volume 121A may be accomplished via an open test part attached to another item (such as a fixture to the chamber wall). Likewise, the second volume 122A may be defined by the volume within the chamber 110A, but outside of the first volume 121A on the other side of the leak test boundary 120A defined by the open test part.

Regardless of whether the test part 101A is open or closed, a membrane 131A is positioned in gaseous communication with one side of the leak test boundary 120A. In FIG. 1A, in which out-leak testing is performed, the membrane 131A is positioned in situ in the second volume 122A outside of the test part 101A. Alternatively, the membrane 131A may be integrated within a wall of the chamber 110A in gaseous communication with the second volume 122A, or may be within the second volume 122A. As a further alternative, the membrane 131A may be rigidly attached internally or externally to the chamber wall, or may be completely external, but in close proximity, to the chamber. In this description and in the claims, an item being in "gaseous communication" with a volume, means that the item is in contact with at least part of the gases within the volume.

Figure 1B:
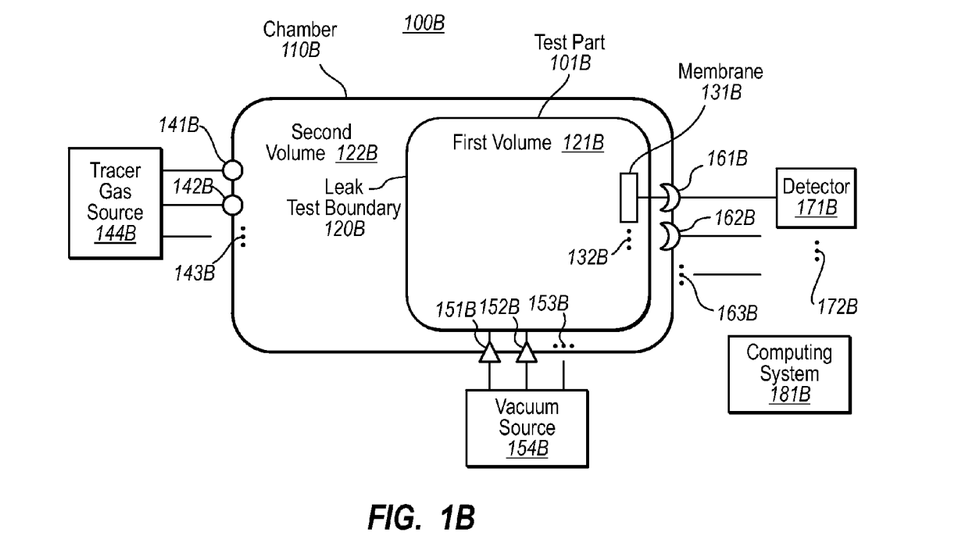
FIG. 1B schematically illustrates another embodiment of a leak test system in accordance with the principles of the present invention in which leaks are detected based on tracer gas flow from the chamber into the test part, and through one or more membranes inside the test part.

The illustrated membrane 131A is represented symbolically in block form, and so illustrated is only an abstract representation of the membrane as is also the case for the membrane of FIG. 1B. Accordingly, FIGS. 1A and 1B should not be construed as providing any representation as to the side or shape of the membrane. In fact, the term "membrane" is used in this description and in the claims very broadly to include any permeable object (regardless of its material, form or structure) that permeates preferentially to the tracer gas as compared to at least most other atmospheric gases. Most membranes, however, allow some amount of gas to permeate even though the membrane is designed to permeate for a particular gas. The use of the membrane also allows for a pressure differential to be maintained between the chamber and other downstream equipment, such as the mass spectrometer, which typically operates at hard vacuum.

The membrane 131A is permeable to the tracer gas. The selection of tracer gas will depend on the application and on the choice of the tester. However, helium or any other gas capable of being detected may be used as the tracer gas. In one embodiment, the membrane 131A is preferentially permeable to the tracer gas such that the membrane 131A allows a greater concentration of permeable gas to permeate the membrane than other gasses in the volume contacting the membrane. For instance, a helium membrane allows helium to permeate, while substantially excluding most gases (except perhaps small quantities of background hydrogen molecules which do not substantially affect the sensitivity of the mass spectrometer to helium).

There may be more than one membrane present in situ within or in gaseous communication with the second volume 122A. For instance, ellipses 132A represents that the number of membranes in the second volume 122A may be two or even more. This allows for a variety of sampling mechanisms as will be described further below, and may even potentially allow for a reasonable estimation of the location of any leaks.

The chamber 110A may include one or more tracer gas introduction ports through which at least tracer gas may be introduced into the opposite side of the leak test boundary 120A into the first volume 121A. In the illustrated example of FIG. 1A, there are two tracer gas introduction portions 141A and 142A illustrated with the ellipses 143A representing flexibility in the number of tracer gas introduction ports present in the chamber 110A. The illustrated tracer gas introduction ports are illustrated as circles merely to differentiate from other ports present in the chamber. As such, and as with FIG. 1B, the circular shape should not be construed as implying anything regarding the structure of the tracer gas introduction ports. The tracer gas introduction ports may be used to introduce pure tracer gas into the first volume 121A, but may also be used to introduce a gaseous mixture that includes the tracer gas into the first volume 121A. A tracer gas source 144A may be used to supply tracer gas, either in pure form or within a gaseous mixture, through the tracer gas introduction port(s).

In one embodiment, rather than including the tracer gas introduction ports, the test part 101A may be simply filled with tracer gas, and then placed into the chamber 110A. An example of such an embodiment will be described below with respect to the non-limiting example of FIG. 4.

The chamber 110A also includes one or more vacuum ports through which a rough vacuum may be applied to the second volume 122A. In the illustrated example of FIG. 1A, there are two vacuum ports 151A and 152A illustrated with ellipses 153A representing flexibility in the number of vacuum ports present in the chamber 110A. The illustrated vacuum ports are illustrated as triangles merely to differentiate from other ports present in the chamber. As such, and as also with FIG. 1B, the triangular shape should not be construed as implying anything regarding the structure of the vacuum ports. A vacuum source 154A may be used to supply the vacuum (whether or it be hard vacuum or a rough vacuum) through the vacuum ports. In one embodiment, a vacuum is not used at all in the second volume 122A. In that case, there need not be any vacuum ports at all.

The chamber 110A further includes one or more tracer gas extraction ports through which tracer gas may be extracted from the chamber 110A. In the illustrated example of FIG. 1A, there are two tracer gas extraction ports 161A and 162A illustrated with ellipses 163A representing flexibility in the number of tracer gas extraction ports present in the chamber 110A. The illustrated tracer gas extraction ports are illustrated as crescents merely to differentiate from other ports present in the chamber. As such, and as also with FIG. 1B, the crescent shape should not be construed as implying anything regarding the structure of the tracer gas extraction ports. Such extracted tracer gas would represent primarily tracer gas that has leaked from the first volume 121A to the second volume 122A (albeit with perhaps some background tracer gas that would be present even without a leak), and that has passed through an associated membrane in gaseous communication with the second volume 122A. Each membrane may have one or more associated tracer gas extraction ports. Alternatively or in addition, if there were multiple membranes in the second volume 122A, then a single tracer gas extraction port may be used to extract gases received through multiple membranes.

A tracer gas detector 171A is coupled to at least one of the one or more tracer gas extraction ports 161A, 162A, 163A. If desired, and although not required, all of the tracer gas extraction ports may be coupled to the same tracer gas detector 171A. Alternatively, if there are multiple tracer gas detectors (as represented by the ellipses 172A), each of the tracer gas detectors may be coupled to only one or a portion of the total number of tracer gas extraction ports. In one embodiment, the tracer gas detector may be a mass spectrometer.

FIG. 1B schematically illustrates a leak testing system 100B in accordance with another embodiment of the principles of the present invention in which in-leak testing is performed. In other words, leaks are detected based on tracer gas passing from the outside to the inside of the test part.

The leak testing system includes a chamber 110B and a test part 101B included within the chamber 110B. Regardless of the particular shape and volume of the chamber 110B, the chamber 110B is structured such that a test part 101B is test configured inside the chamber 110B. Once again, with in-leak testing, the test part 101B may be a closed test part or an open test part. If a closed test part, the inside of the chamber includes a first volume 121B within the test part 101B, and a second volume 122B outside of the test part 101B but still within the chamber 110B. In the case of a closed test part 101B, the test part 101B defines a leak test boundary 120B between the first and second volumes 121B and 122B. If the test part 101B is an open test part, then the test part 101B may be attached to one or more other items (e.g., one or more walls of the chamber 110B, and/or one or more fixtures), to thereby define the first and second volumes 121B and 122B. In that case, the open test part would still define a leak test boundary, even though attached items may be needed to define volumes on each side of the leak test boundary.

A membrane 131B is positioned non-external to the chamber 110B in gaseous communication with one side of the leak test boundary 120B. In FIG. 1B, in which in-leak testing is performed, the membrane 131B is positioned in the first volume 121B inside the test part 101B, or at least in gaseous communication with the first volume 121B while remaining non-external to the chamber 110B.

Once again, the membrane 131B is permeable to the tracer gas, the selection of which will depend on the application and on the choice of the tester. The membrane 131B of FIG. 1B may be similar to the membrane 131B described with respect to FIG. 1A. Furthermore, there may be more than one membrane in gaseous communication with the first volume 121B as represented by ellipses 132B.

The chamber 110B includes one or more tracer gas introduction ports through which at least tracer gas may be introduced into the opposite side of the leak test boundary 120B into the second volume 122B. In the illustrated example of FIG. 1B, there are two tracer gas introduction portions 141B and 142B illustrated with the ellipses 143B representing flexibility in the number of tracer gas introduction ports present in the chamber 110B. The tracer gas introduction ports may be used to introduce pure tracer gas into the second volume 122B, but may also be used to introduce a gaseous mixture that includes the tracer gas into the second volume 122B. A tracer gas source 144B may be used to supply tracer gas, either in pure form or within a gaseous mixture, through the tracer gas introduction port(s).

The chamber 110B also includes one or more vacuum ports through which a vacuum may be applied to the first volume 121B. In the illustrated example of FIG. 1B, there are two vacuum ports 151B and 152B illustrated with ellipses 153B representing flexibility in the number of vacuum ports present in the chamber 110B. A vacuum source 154B may be used to supply the vacuum through the vacuum ports. Alternatively, if a vacuum is not used in the first volume 121B, vacuum ports need not be present.

The chamber 110B further includes one or more tracer gas extraction ports through which tracer gas may be extracted from the chamber 110B. In the illustrated example of FIG. 1B, there are two tracer gas extraction ports 161B and 162B illustrated with ellipses 163B representing flexibility in the number of tracer gas extraction ports present in the chamber 110B. Such extracted tracer gas would represent primarily tracer gas that has leaked from the second volume 122B to the first volume 121B, and that has passed through an associated membrane in gaseous communication with the first volume 121B. Each membrane may have one or more associated tracer gas extraction ports. Alternatively or in addition, if there were multiple membranes in the first volume 121B, then a single tracer gas extraction port may be used to extract gases received through multiple membranes.

A tracer gas detector 171B is coupled to at least one of the one or more tracer gas extraction ports 161B, 162B, 163B. If desired, and although not required, all of the tracer gas extraction ports may be coupled to the same tracer gas detector 171B. Alternatively, if there are multiple tracer gas detectors (as represented by the ellipses 172B), each of the tracer gas detectors (e.g., which may be mass spectrometers) may be coupled to only one or a portion of the total number of tracer gas extraction ports.

In both the embodiments of FIGS. 1A and 1B, there is a computing system 181A and 181B, respectively, that is associated with the leak test system. The computing system may be used to perform a wide variety of task with respect to the leak test system. For instance, the computing system may be capable of performing one or more of the following:

1) controlling the introducing of tracer gas into the system by controlling the tracer gas sources 144A or 144B, or by controlling the flow of tracer gas through individual tracer gas ports 141A, 142A and/or 143A or 141B, 142B and/or 143B;

2) controlling the application of a vacuum to the other side of the leak test boundary by controlling the vacuum sources 154A or 154B, or by controlling the drawing of a vacuum through individual vacuum ports 151A, 152A and/or 153A or 151B, 152B and/or 153B;

3) controlling the sampling of the gasses that pass the membranes by controlling the detector(s) 171A and/or 172A or detectors 171B and/or 172B, and/or by controlling the drawing of sampled gas through tracer gas extraction ports 161A, 162A and/or 163A or 161B, 162B and/or 163B; and/or 4) interpreting the leak test results provided by the detectors 171A and/or 172A or 171B and/or 172B.

For instance, in a multiple membrane embodiment in which multiple membranes are placed in situ in the chamber and/or in gaseous communication with the chamber wall, the computing system might assist in performing sampling of tracer gas from multiple membranes using a single detector in a time-division multiplexed manner. For instance, tracer gas from one membrane may be measured by the mass spectrometer in one instant, while in the next time interval, tracer gas from another membrane may be detected using the same mass spectrometer, and so forth for perhaps one or more other membranes distributed throughout the test volume. Various valve configurations may be used to selectively isolate and couple the membranes from and to the sampling process to facilitate such sequential sampling. The computing system may also use the results to estimate one or more leak locations. For instance, if one membrane picks up tracer gas earlier than another and/or at high concentrations compared to another, the computing system might process that information to estimate that the leak is closer to the first membrane. The computing system may even perform triangulation techniques using a larger number of membranes, and may be able to detect an estimated location for a number of different leak locations.

Figure 2:
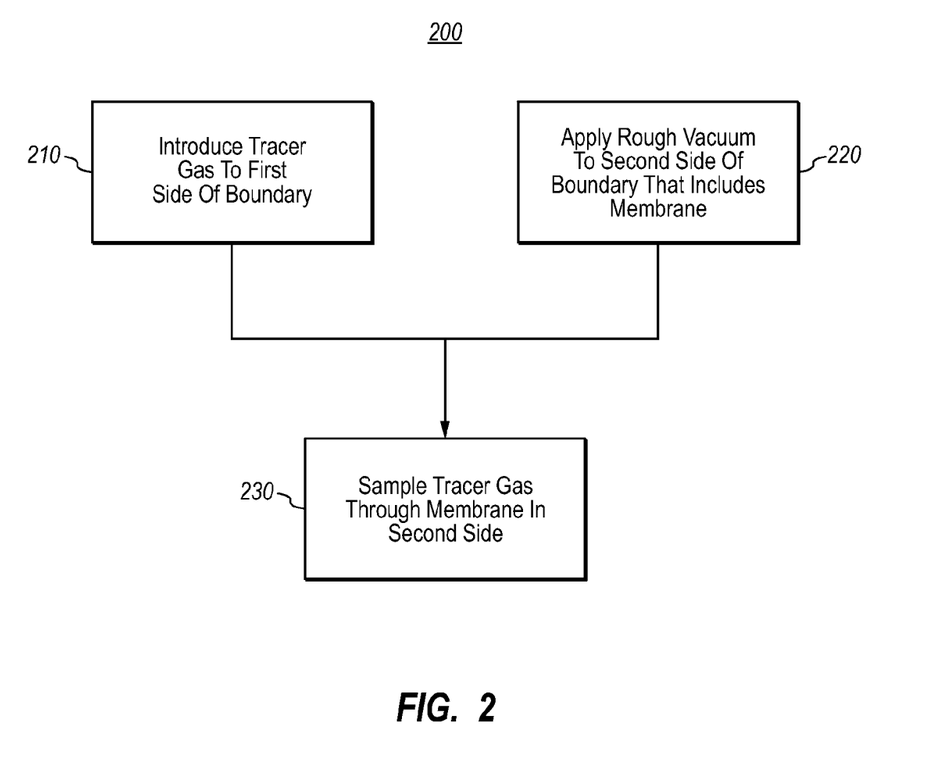
FIG. 2 illustrates a flowchart of a method for performing leak testing in accordance with one aspect of the principles of the present invention.

FIG. 2 illustrates a flowchart of a method 200 for performing leak detection in accordance with one embodiment of the present invention. As the method 200 may be performed in the context of the environments described with respect to FIGS. 1A and 1B, although the method is not limited to such environments, the method 200 will now be described with frequent reference to the leak test systems 100A and 100B of FIGS. 1A and 1B.

The method 200 includes an act of introducing tracer gas into a first side of a leak test boundary within a chamber (act 210). For instance, in FIG. 1A, tracer gas (which may be pure tracer gas, or a mixture that includes the tracer gas) may be introduced into the first volume 121A via one or more ports 141A, 142A and 143A. Alternatively, the tracer gas may have been introduced into the first volume 121A prior to the test part 101A being placed into the chamber 110A, if the test part 101A were a closed test part. In FIG. 1B, tracer gas may be introduced into the second volume 122B using one or more ports 141B, 142B and 143B.

After introducing the tracer gas into the first side of the leak test boundary (act 210), a mass spectrometer or other detector may be used to measure a quantity of tracer gas (act 230). Such tracer gas passed from the first side of the leak test boundary within the chamber to the second side of the leak test boundary within the chamber. The tracer gas subsequently passed from the second side of the leak test boundary through a membrane that is either integrated within a wall of the chamber at the second side of the leak test boundary, or is within the second side of the boundary within the chamber.

For instance, referring to FIG. 1A, detector 171A (which may be a mass spectrometer) receives tracer gas samples that include tracer gas that leaks from the first volume 121A, through the leak test boundary 120A and into the second volume 122A, and then passes through membrane(s) 131A and 132A to be received through port(s) 161A, 162A and 163A. Referring to FIG. 1B, detector 171B receives tracer gas samples that include tracer gas that leaks from the second volume 122B through the leak test boundary 120B into the first volume 121B, and then is received through the membrane(s) 131B and 132B, and through the ports 161B, 162B and 163B.

Optionally, prior to sampling, a rough vacuum or a medium rough vacuum may be applied to the second side of the leak test boundary (act 220). For instance, in FIG. 1A, a vacuum may be applied to the second volume 122A through the vacuum port(s) 151A, 152A and 153A. In FIG. 1B, a vacuum may be applied to the first volume 121B through the vacuum port(s) 151B, 152B and 153B. The use of a membrane between the chamber and the detector permits a pressure differential between the chamber and the detector. Accordingly, the mass spectrometer may operate under hard vacuum, while the chamber is in no vacuum or just a rough vacuum. Nevertheless, the broader principles of the present invention do not exclude, by any means, the application of a hard vacuum in the chamber during the testing process.

By sampling through a membrane (or other permeable object), other contaminants are kept from the detectors and from other equipment downstream from the membrane. Furthermore, since the membrane is in situ, rigidly attached to, and/or in close proximity to the chamber, the leaked tracer gas need not travel a significant distance before passing through the membrane. Accordingly, the amount of tracer gas passing through the membrane is a more real-time representation of the actual tracer gas amounts present in the second volume.

Also, if a rough vacuum is used, the rough vacuum permits for faster testing than if a hard vacuum were used (although the principles of the present invention may be practiced with a hard vacuum in the chamber), and may be performed with less harm to vacuum-sensitive parts. Furthermore, the leaking tracer gas mixes faster under a rough vacuum than under regular atmosphere, thereby further enabling more real-time measurements than conventional accumulation methods. Such mixing may even be achieved without mixing equipment that is sometimes used in conventional accumulation leak test methods.

As mentioned above, many aspects of the control and detection in the leak detection process may be facilitated by a computing system. The computing system may be a general purpose or special purpose computing system, or a combination thereof. While the principles of the present invention are not limited to embodiments that use a computing system, if a computing system is used, any computing system suitably configured will suffice.

Figure 3:
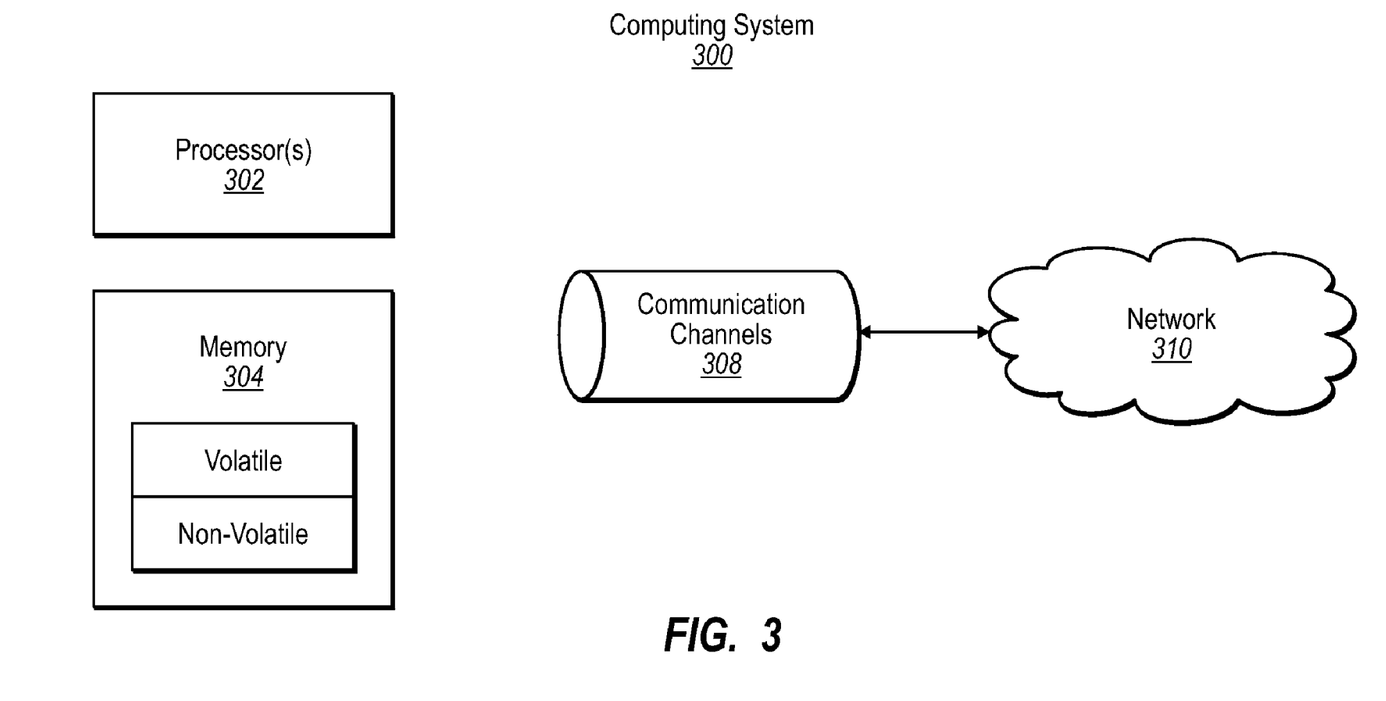
FIG. 3 illustrates a computing system in which embodiments of the present invention may be practiced in whole or in part.

FIG. 3 shows a schematic diagram of an example computing system 300 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 3.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 3, in its most basic configuration, a computing system 300 typically includes at least one processing unit 302 and memory 304. The memory 304 may be system memory, which may be volatile, non-volatile, or some combination of the two. The term "memory" may also be used herein to refer to non-volatile mass storage such as physical storage media. While the computing system described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 304 of the computing system 300.

Computing system 300 may also contain communication channels 308 that allow the computing system 300 to communicate with other computing systems over, for example, network 310. Communication channels 308 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 4:
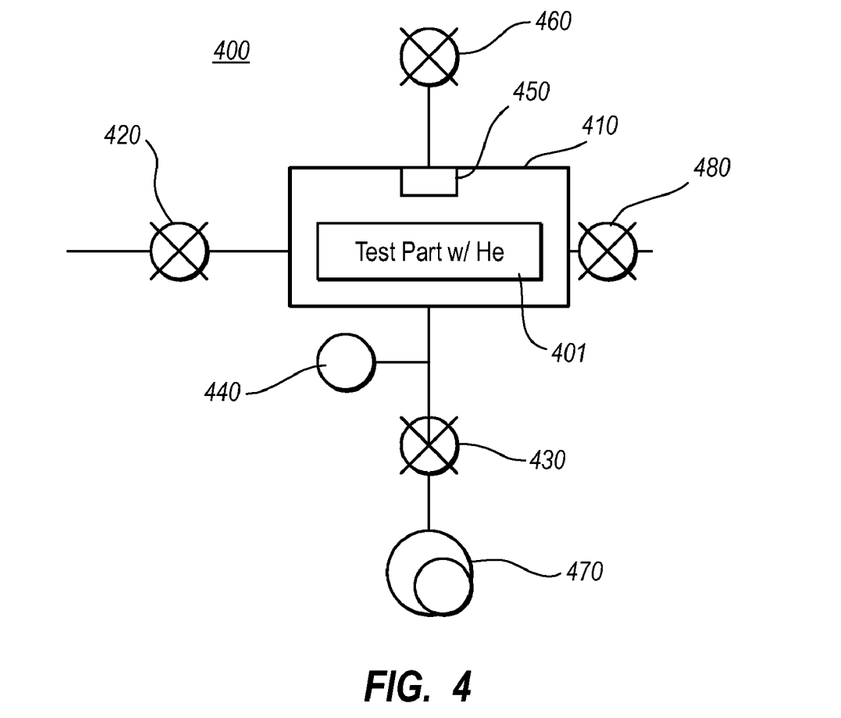
FIG. 4 illustrates a specific example leak test system that is consistent with the principles of the present invention.

FIG. 4 illustrates a specific example of a leak test system 400 that is consistent with the principles of the present invention. Of course, since this is a specific example only, the features illustrated and described with respect to FIG. 4 should not be viewed as limiting the claims, but are merely illustrative of a specific example. In this specific example, helium is the tracer gas for illustrative purposes. The leak test system 400 includes a test part 401 inside of a chamber 410 that has integrated into one of its walls a membrane 450 through which helium may be sampled.

In this example, there are no tracer gas introduction ports required in the chamber since the test part 401 is filled with tracer gas before being placed in the chamber 410. The test part 401 is then placed in the chamber 410, and the helium sampling isolation valve 460 is opened.

In this example, a rough vacuum or a medium rough vacuum is employed. Accordingly, once the chamber 410 is closed, the chamber 410 is evacuated to a rough vacuum using the vacuum pump 470, through the vacuum valve 430, while the vacuum level may be monitored using the pressure gauge 440. Even as the vacuum is being pulled, helium may be sampled through the helium isolation value 460 with a mass spectrometer (not shown in FIG. 4, but represented in FIGS. 1A and 1B). If there are larger leaks (sometimes termed "gross" leaks), the mass spectrometer may detect such leaks even before the vacuum is pulled.

Upon evaluating the chamber 410 to a sufficient vacuum level, the vacuum valve 430 is closed, and the helium isolation valve 460 is opened if it was not already opened. A short stabilization time may be used to assure steady state conditions. After a short period of time, a helium reading is taken using the helium samples received through the membrane 450. This may establish a helium background reading.

The helium signal (the level of helium detected as passing through the membrane 450) is monitored over the test time. The slope of the helium signal is then calculated over time. The slope of the helium concentration change over time is representative of the magnitude of the leak in the test part. In one embodiment, the rejection criteria may be a function of both the slope of the helium concentration change, as well as the elapsed test time. For instance, once an unacceptable leak has been detected, the testing process may be ended even before the testing time would have completed had the test part not had an unacceptable leak. The threshold in the helium slope for rejecting a part might well depend on the elapsed time in the testing process. In this way, test part that are far below acceptable may have shorter testing times than test parts that are only marginally unacceptable, or than test parts that are acceptable.

For instance, if the test has only just begun, the testing process may refrain from failing the test part even if the helium slopes were quite high. If the elapsed time were perhaps half of the total time, then the rejection criteria might be reduced to perhaps only twice the rejection criteria for the entire test period. If the testing process is allowed to continue through the entire testing time, then a final determination may be made based on the final measured helium slope.

At the end of the test, the chamber 410 may be vented through vent/purge valve 420, and the test part 401 may be removed from the chamber 410. The vent/purge valve 420 may be open to atmosphere or plumbed with compressed air or nitrogen.

In one embodiment, the vent port associated with the vent valve 420 may be located near the opposite position of the chamber 410 as the vacuum port associated with the vacuum valve 430. If a purging is to be performed, both the vent/purge value 420 and the vacuum valve 430 may be opened. A purge step at the beginning or end of the test may be implemented to flush away residual helium. By performing such a purge, and by placing the valves 420 and 430 on opposite sides of the chamber 410, helium background noise may be reduced for the next test. To purge the membrane 450, if very fast recovery of helium background is desired, small jets or ports can be integrated into the membrane holder that directs jets of air or nitrogen to flush away residual helium. To further minimize residual ambient helium background, the test chamber can be purged with nitrogen gas which has a lower concentration of helium than air.

In order to calibrate the leak test system 400, the same acts just described may be performed with the following exceptions.

First, a known good test part is placed in the chamber 410 instead of a test part that has unknown leak characteristics. The good test part preferably occupies about the same amount of volume as the test part that is to be tested.

Second, a calibrated leak valve 480 is opened at the beginning of the sequence and left open until the test step is complete. The opening of the calibrated leak valve 480 simulates the maximum amount of helium leak that would be acceptable in a test part. Incidentally, a baseline or zero test can be run with the known good part without opening the calibrated leak valve to insure that the part is properly identified as good. The helium slope measured during this test would then be used in subsequent tests as a threshold for rejecting or accepting test parts.

In another embodiment, calibration may be performed as described above, except instead of plumbing a calibrated leak standard to the test chamber with an isolation valve, the leak is actually built with a known leak. This test part, with its calibrated leak, can then be used to mimic a real leak and act to calibrate the system. In another embodiment, a combination of the plumbed leak and the leak built into the part may act as the leak standard.

Figure 5:
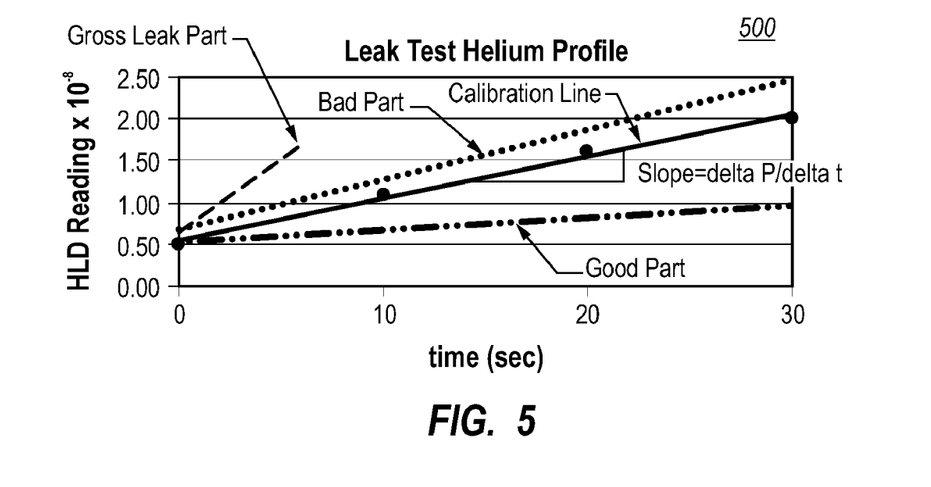
FIG. 5 illustrates an example tracer gas leak profile used to describe one embodiment of a leak test method.

FIG. 5 illustrates a helium leak test profile graph 500 which shows how the helium signal may change over time, and how a test part may be accepted or rejected in this type of leak test. Each of the helium profiles begins at time 0 with helium levels approximately equal to the helium background noise of the system. Neglecting the helium background noise, each line in the graph is simply the plot of the equation:

$$Q=V(P_1-P_2)/(t_1-t_2) \qquad \text{Equation (1)}$$

where,
Q=leak rate (in atmcc/sec),
V=test volume (in cc),
$P_1-P_2$=change in helium partial pressure (in atm), and
$t_1-t_2$=elapsed time (in sec).

From time 0, the rate that the helium levels rise is indicative of the magnitude of any leaks in the test part. The calibration line represents the acceptable leak test standard as is represented by the solid line in FIG. 5.

A test part that has a gross leak part has a slope that is well above the calibrated line, as can be seen from the dashed line in FIG. 5. Thus, that leak test may end early with the test part being rejected.

Another helium profile shows that of a bad part as represented by the dotted line in FIG. 5. The bad part does not contain gross leaks, but is nevertheless above the calibration line. Accordingly, at the end of the test, that part may be rejected.

The helium profile for a good part is also shown as represented by the intermittent dotted-dashed line in FIG. 5. In this case, the helium profile for the good part is well below the calibrated line.

In one embodiment, different calibration lines may be used for different ratings. The rating may be associated with the test part, with different applications for the test part being appropriate based on the ratings.

Figure 6:
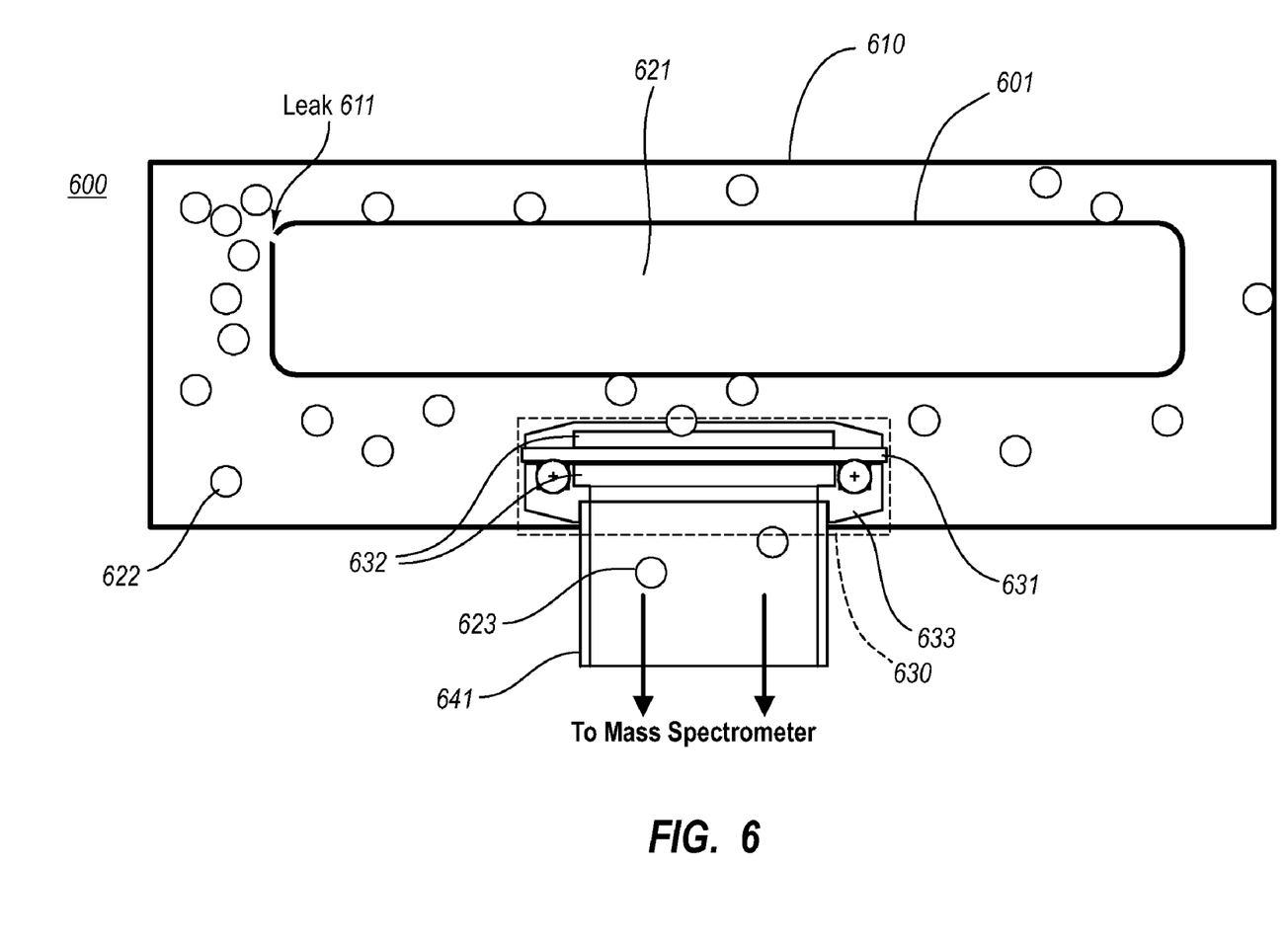
FIG. 6 illustrates another specific example leak test system that illustrates an example membrane in specific detail.

FIG. 6 illustrates another specific example of a leak test system 600 in accordance with one specific example of the principles of the present invention. The leak test system includes a test part 601 filled with helium 621 placed inside a chamber 610. Helium 622 emits from leak 611. A tracer gas extraction port 630 then receives the helium for sampling by a downstream mass spectrometer (not shown in FIG. 6).

The tracer gas extraction port 630 includes a permeable membrane 631 that allows the tracer gas to permeate more readily than other atmospheric gases. Accordingly, more helium 623 will pass through the membrane 631 than other gases given the same partial pressure. The partial pressure of helium in the chamber due to a leak will be greater than the partial pressure of the helium on the mass spectrometer side of the membrane 631 (which may be at hard vacuum).

Accordingly, primarily helium (or at least higher concentrations of helium than were present in the chamber) are passed through channel 641 to the mass spectrometer. The tracer gas extraction port 630 includes a membrane support 632 that provides structural support for the membrane 631 while allowing gasses to pass to the membrane 631 and from the membrane 631. A holder 633 acts to further hold the membrane support 632 and the membrane 631 in place. In one embodiment, the holder 633 is actually integrated within the wall of the chamber, with the membrane support 632 and membrane 631 acting as part of the chamber wall. Alternatively, the holder 633 may be rigidly attached to the inside or outside of the chamber.

The membrane 631 can be constructed of any material that permeates tracer gas (e.g., helium) at higher rates compared to other gases. The permeability, surface area, and thickness of the membrane may be sized to allow sufficiently helium to pass through and give a quick enough response time. A membrane is desirable because of its large ratio of surface area to thickness. However, any shape of permeable material can be used given the rate of permeation is sufficiently high enough. In this description and in the claims, a "membrane" is defined to include any material (whatever its form) that is more permeable to the tracer gas that other atmospheric gasses.

In the case of helium, membranes may be constructed of Teflon, polypropylene, glass, quartz, or one of many other plastics. To improve helium permutation, the membrane may be heated. Heating the membrane will increase its permeability, thereby permitting a larger number of choices in the membrane material for a given application. Furthermore, for applications where ambient temperature can vary significantly, a heater may be incorporated into the membrane holder to hold the membrane at a relatively constant temperature. This would reduce the effect of ambient temperature changes on membrane permeability.

Accordingly, a leak test system has been described which integrates a membrane inside a leak test chamber, or within the walls of the leak test chamber. Having described the principles of the present invention, various modifications, additions, and deletions will become apparent to those of ordinary skill in the art after having read this description.

For instance, the membrane may be made quite large, and built into the chamber wall or surrounding the part as part of a custom fit chamber.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A leak testing system comprising:
   a chamber that is structured such that when a test part is test configured inside the chamber, the inside of the chamber includes a first volume within the test part, and a second volume outside of the test part but within the chamber, wherein the test part defines a leak test boundary between the first and second volumes; and
   a membrane positioned in gaseous communication with the leak test boundary, wherein the membrane is permeable to tracer gas, wherein the chamber includes the following:
   one or more tracer gas extraction ports through which leaked tracer gas may be extracted from the chamber for sampling external to the chamber, the leaked tracer gas being tracer gas that has leaked through the leak test boundary and passed through the membrane.

2. The leak testing system in accordance with claim 1, wherein the membrane is positioned in situ within the chamber.

3. The leak testing system in accordance with claim 1, wherein the membrane is rigidly attached to a wall of the chamber.

4. The leak testing system in accordance with claim 1, wherein the membrane is integrated within the wall of the chamber.

5. The leak testing system in accordance with claim 1, wherein the membrane is positioned external to, but in close proximity to, the chamber.

6. The leak testing system in accordance with claim 1, wherein the membrane is integrated within a wall of the chamber.

7. The leak testing system in accordance with claim 1, wherein the membrane is preferential to the tracer gas.

8. The leak testing system in accordance with claim 1, wherein the membrane is in gaseous communication with the leak test boundary via the first volume.

9. The leak testing system in accordance with claim 1, wherein the membrane is in gaseous communication with the leak test boundary via the second volume.

10. The leak testing system in accordance with claim 1, wherein the tracer gas is helium.

11. The leak testing system in accordance with claim 1, further comprising:
    the test part test configured within the chamber.

12. The leak testing system in accordance with claim 1, wherein the one or more tracer gas extraction ports includes a plurality of tracer gas extraction ports.

13. The leak testing system in accordance with claim 1, wherein the test part is a closed test part.

14. The leak testing system in accordance with claim 1, wherein the test part is an open test part.

15. The leak testing system in accordance with claim 1, further comprising:
a tracer gas mass spectrometer coupled to at least some of the plurality of tracer gas extraction ports.

16. The leak testing system in accordance with claim 15, further comprising:
a computing system capable of controlling the tracer gas mass spectrometer to sample the at least some of the plurality of tracer gas extraction ports in a time-division-multiplexed manner, and capable of interpreting the results of the time-division-multiplexed sampling.

17. The leak testing system in accordance with claim 1, wherein the chamber further includes one or more tracer gas introduction ports through which at least tracer gas may be introduced on one side of the leak test boundary.

18. The leak testing system in accordance with claim 17, wherein the chamber further includes one or more vacuum ports through which a vacuum may be applied on an opposite side of the leak test boundary as compared to the side on which the tracer gas is introduced.

19. The leak testing system in accordance with claim 1, wherein the chamber further includes one or more vacuum ports through which a vacuum may be applied on one side of the leak test boundary.

20. The leak testing system in accordance with claim 19, further comprising:
a vacuum application mechanism for applying a rough vacuum through the one or more vacuum ports.

21. The leak testing system in accordance with claim 19, further comprising:
a vacuum application mechanism for applying a medium rough vacuum through the one or more vacuum ports.

22. The leak testing system in accordance with claim 1, further comprising:
a tracer gas mass spectrometer coupled to at least one of the one or more tracer gas extraction ports.

23. The leak testing system in accordance with claim 22, further comprising:
a computing system capable of interpreting leak test result provided by the tracer gas mass spectrometer.

24. The leak testing system in accordance with claim 23, wherein the computing system is further capable of controlling introduction of tracer gas on one side of the leak test boundary, and controlling application of a vacuum on an opposite side of the leak test boundary as compared to the side on which the tracer gas is introduced.

25. A testing method comprising:
an act of introducing tracer gas on one side of a leak test boundary within a chamber; and
after the act of introducing, an act of extracting leaked tracer gas from the chamber from an opposite side of the leak test boundary as compared to the side on which the tracer gas was introduced, such that the extracted tracer gas is tracer gas that has leaked across the leak test boundary and through a membrane that is in gaseous communication with the leak test boundary; and
an act of using a mass spectrometer external to the chamber to measure a quantity of leaked tracer gas that is extracted from the chamber via the act of extracting.

26. The testing method of claim 25, further comprising:
an act of applying a rough vacuum to the side of the leak test boundary from which the leaked tracer gas is extracted.

27. A computer program product comprising one or more non-transitory computer-readable media having thereon computer-executable instructions that, when executed by one or more processors of the computing system, cause the computing system to control the following:
an act of using a mass spectrometer to measure a quantity of tracer gas that passes through a leak test boundary within a chamber and that subsequently passes through a membrane prior to being extracted from the chamber for measurement by the mass spectrometer.

28. A computer program product in accordance with claim 27, wherein the computer-executable instructions further include computer-executable instructions that, when executed by the one or more processors of the computing system, further cause the computing system to perform the following:
an act of estimating a location of a leak in the leak test boundary using at least in part the act of using the mass spectrometer.

* * * * *